(12) United States Patent
Takeuchi (10) Patent No.: US 6,661,538 B1
(45) Date of Patent: Dec. 9, 2003

(54) IMAGE READING APPARATUS AND METHOD OF ASSEMBLING THE SAME

(75) Inventor: Yukitoshi Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/317,833

(22) Filed: May 25, 1999

(30) Foreign Application Priority Data

May 29, 1998 (JP) ............................... 10-166112
Jun. 11, 1998 (JP) ............................... 10-163278

(51) Int. Cl.[7] ............................................... H04N 1/04
(52) U.S. Cl. ........................................ 358/474; 358/487
(58) Field of Search .................................. 358/400, 474, 358/475, 500, 468, 494, 495, 496, 497, 471, 487

(56) References Cited

U.S. PATENT DOCUMENTS

| | | | |
|---|---|---|---|
| 3,615,134 A | 10/1971 | Newcomb | 355/75 |
| 5,060,018 A * | 10/1991 | Watanabe | 355/230 |
| 5,311,015 A | 5/1994 | Takeuchi | 250/234 |
| 5,483,325 A * | 1/1996 | Boapati | 355/230 |
| 5,781,313 A | 7/1998 | Nose et al. | 358/497 |
| 5,920,758 A * | 7/1999 | Ohtsuki | 399/405 |
| 5,986,775 A * | 11/1999 | Yoshimizu | 358/496 |
| 6,076,460 A * | 6/2000 | Kagawa | 101/128.4 |
| 6,085,063 A * | 7/2000 | Morita | 399/381 |
| 6,088,025 A * | 7/2000 | Akamine | 345/175 |
| 6,101,004 A * | 8/2000 | Sung | 358/497 |
| 6,369,875 B1 * | 4/2002 | Ito | 355/43 |

FOREIGN PATENT DOCUMENTS

| | | | | |
|---|---|---|---|---|
| EP | 0653876 A1 | | 5/1995 | .......... H04N/1/031 |
| JP | 9153987 | | 9/1997 | ............ H04N/1/10 |
| JP | 2001-238012 | * | 8/2001 | ............ H04N/1/00 |

* cited by examiner

Primary Examiner—Jerome Grant, II
(74) Attorney, Agent, or Firm—Fitzpatrick, Cella, Harper & Scinto

(57) ABSTRACT

An image reading apparatus includes a transparent plate for supporting an original thereon, a reading unit for reading the original, and a one-piece frame member for containing the reading unit, the transparent plate being held the frame member.

17 Claims, 11 Drawing Sheets

IMAGE READING APPARATUS AND METHOD OF ASSEMBLING THE SAME

BACKGROUND OF THE INVENTION

1. Field of the Invention

This invention relates to an image reading apparatus for reading the image information of an original such as a photograph or a document and a method of assembling the same.

2. Related Background Art

Figure 5A:
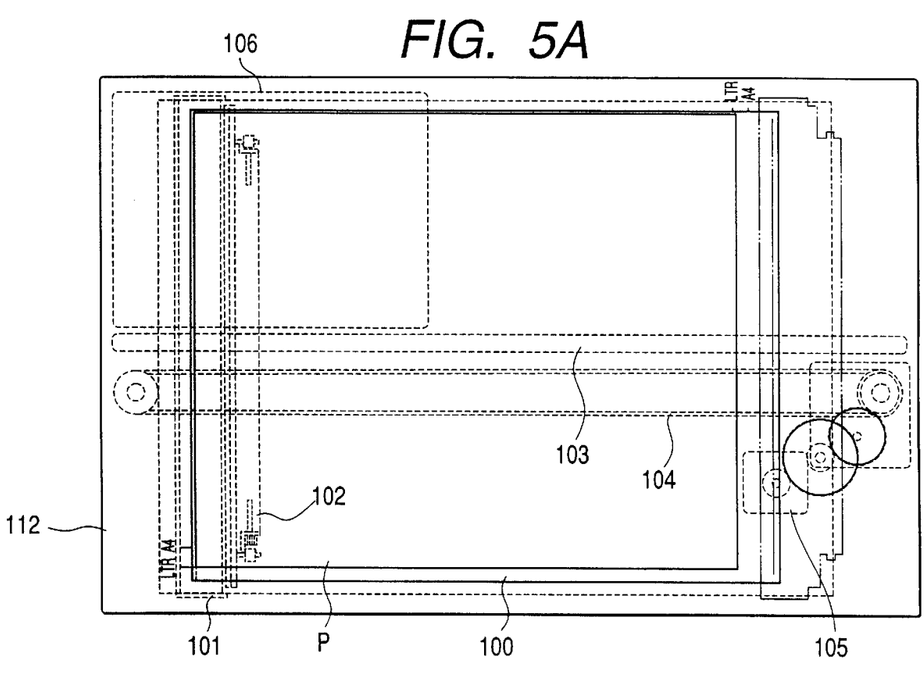
FIGS. 5A, 5B and 5C are illustrations of an image reading apparatus according to the earlier technology.
Figure 5B:
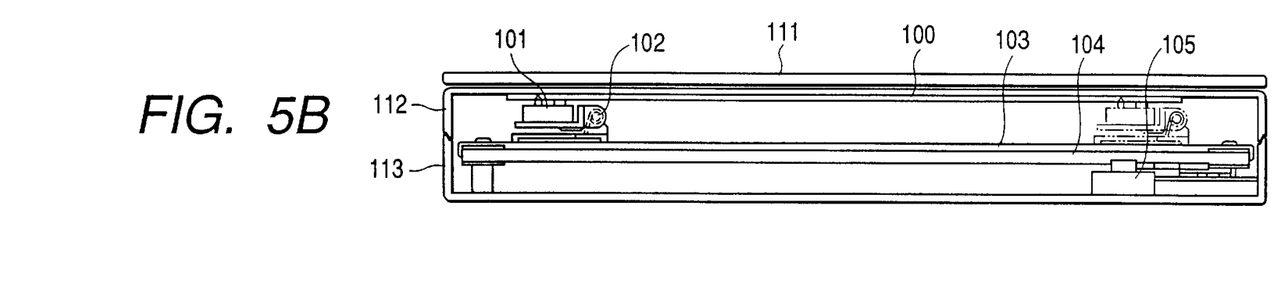
Figure 5C:
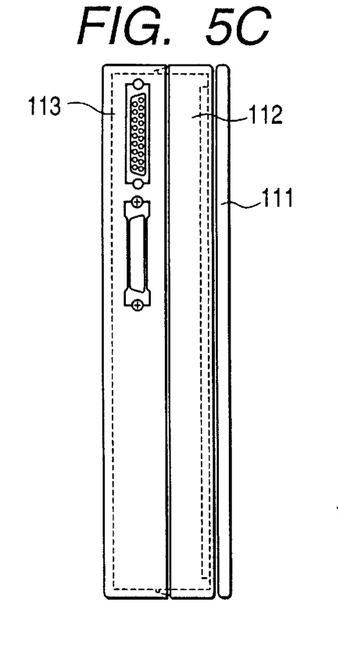

FIGS. 5A, 5B and 5C of the accompanying drawings are a plan view, a cross-sectional view and a side view, respectively, schematically showing the construction of a colored image reading apparatus according to the earlier technology.

The letter P designates an original placed on an original supporting glass plate 100, and a reading unit 101 is scanned in parallelism to the original supporting glass plate 100 to thereby read an image on the original.

Figure 6:
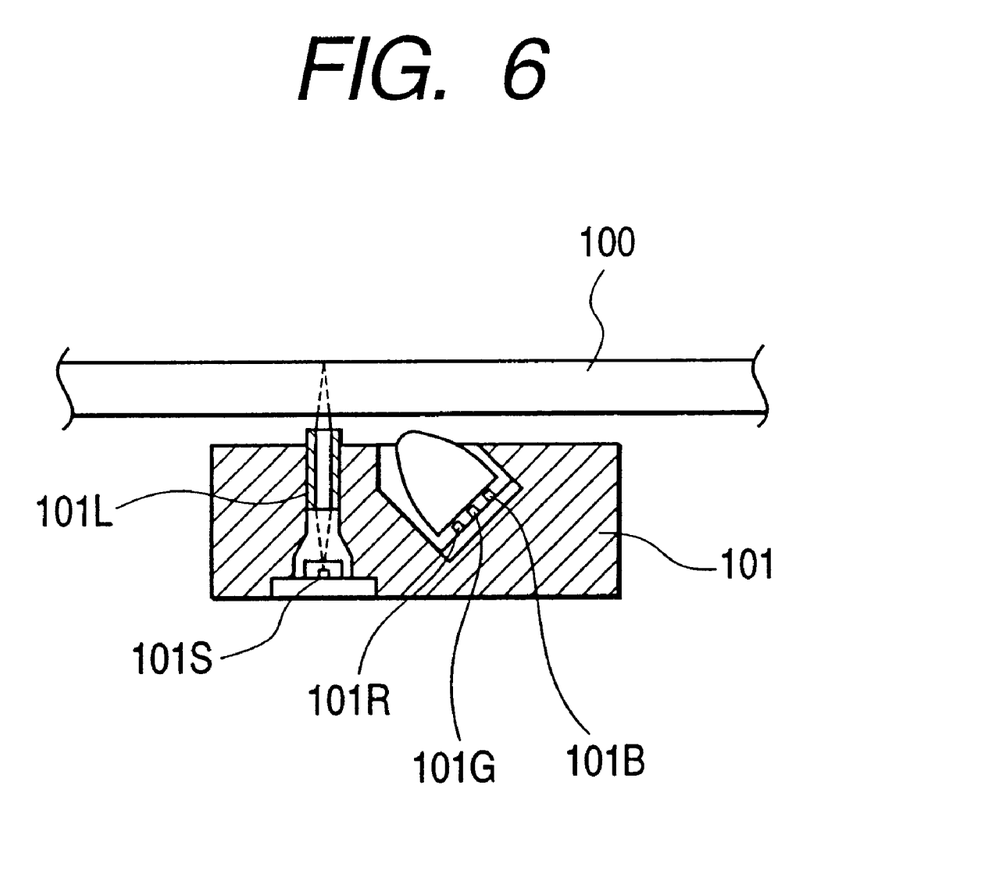
FIG. 6 is an illustration of the construction of a reading unit.

The reading unit 101, as schematically shown in FIG. 6 of the accompanying drawings, has incorporated therein LED's of three colors (101R, 101G and 101B) which are light sources for irradiating the original, a rod lens array 101L for imaging the reflected light from the original on the light receiving element of an image sensor, and an image sensor 101S.

The light sources of three colors are successively changed over and turned on, and the image sensor reads the reflected light of each color from the original to thereby effect color separating and reading.

The reading unit 101 is fixedly supported on a slider 102 sliding on a guide shaft 103 fixed to the apparatus body. Also, a belt 104 for transmitting the motive power from a motor 105 which is a scanning drive source is fixed to the slider 102. By the forward and reverse rotations of the motor 105, the reading unit 101 can be reciprocally scanned within the image reading range of the original supporting glass plate 100.

The constituents of the image reading apparatus further include an electrically equipped portion 106 comprising a control board and a power source. These constituents are disposed in a housing comprising a combination of an upper cover 112 for fixedly supporting the original supporting glass plate and a lower cover 113.

An original cover 111 for pressing the original against the original supporting glass plate is openably and closably mounted on the original supporting glass plate 100.

Figure 7:
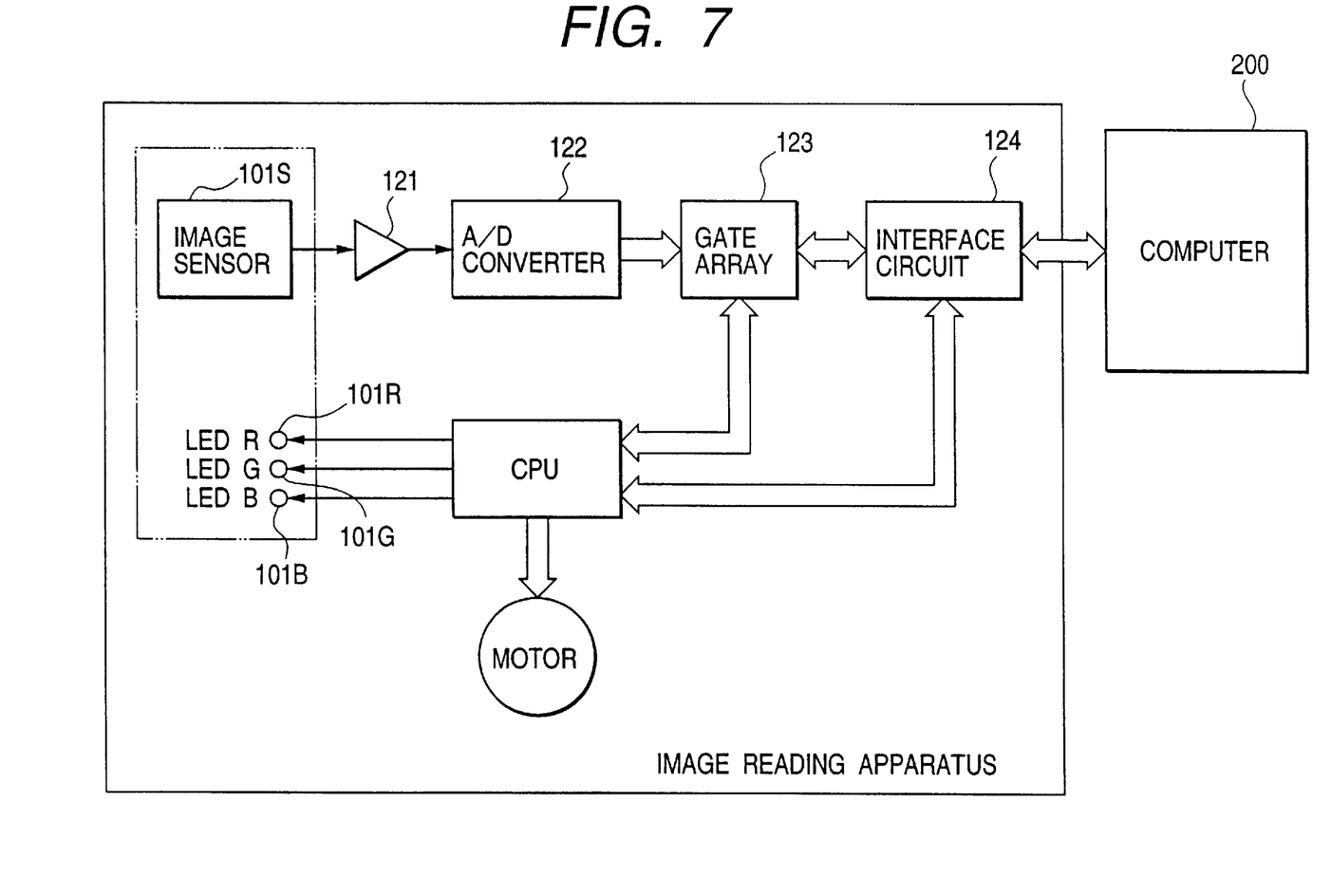
FIG. 7 is a read image data processing block diagram.

FIG. 7 of the accompanying drawings is a read image data processing block diagram by the present image reading apparatus. An image output signal read by the image sensor 101S in synchronism with the LED's successively turned on and off is sent to an amplifier 121 and is amplified thereby, whereafter it is converted into an image signal by an A/D converter 122.

The A/D converter 122 divides the dynamic range (the difference between the read outputs of the pure white portion and intense black portion on the original) of the image sensor into the number of bits thereof, and allots the number of gradation in conformity with the brightness of the image on the original. When for example, an A/D converter of resolving power of 8 bits is used, white to black can be discriminated into 256 gradation levels, and when an A/D converter of resolving power of 10 bits is used, white to black can be discriminated into 1024 dradation levels.

Accordingly, in an image reading apparatus using an A/D converter of 8 bits, 24 bits=about 16,700,000 colors can be discriminated in the cover reading by light sources of three colors R, G and B, and in the case of 10 bits, 30 bits=about 1,074,000,000 colors can be discriminated.

There are several kinds of output forms of the image signal of the image reading apparatus, and depending on the use of a read image, an output form suited therefor can be selected.

When a writing is to be read and its content is applied to OCR or when a monochromatic line drawing is to be read, a monochromatic binary image is suited therefor, and use is made of image data resulting from an image signal obtained with e.g. only G of the above-mentioned R, G and B light sources turned on having been binarized by a certain threshold value in an image processing circuit incorporated in a gate array 123.

When an image is to be read with a view to read an image such as a photograph and output it to a monochromatic printer, use is made of image data binarized by using an image signal also by the G light source and by the use of half-tone processing such as a dither method or an error diffusing method.

When the processing of a colored image is to be effected, image data of multiple values (such as 24 bits) is suitable.

The image signal passed through the image processing circuit is outputted to an apparatus 200 such as a personal computer through an interface circuit 124.

General as the construction of the housing of the above-described image reading apparatus is a two-piece construction in which the upper cover 112 made of resin on which the original supporting glass plate 100 is mounted is put on the lower cover 113 made of resin on which the constituents are placed.

However, the covers made of resin has the disadvantages that their cost is high and moreover they are weak in rigidity and are difficult to provide dimensional accuracy.

Accordingly, it has been necessary to cope with it by a construction in which the covers are provided with a number of reinforcing ribs to secure rigidity or a designing technique for making the structure of the place constituent side firm and difficult to deform.

Also, the constituent for effecting reading scan is placed on the lower cover 113 and thus, the upper cover 112 intervenes between it and the original supporting glass plate 100, and the dimensional accuracy of the upper cover 112 had the possibility of affecting the scanning parallelism to the original supporting glass plate 100.

SUMMARY OF THE INVENTION

The present invention has been made in order to solve the above-noted problems peculiar to the earlier technology and an object thereof is to provide an image reading apparatus which is inexpensive and easy to provide dimensional accuracy as well as high in rigidity.

Another object of the present invention is to provide an image reading apparatus having a transparent plate for supporting an original thereon, a reading unit for reading the original, and a one-piece frame member containing the reading unit therein.

Still another object of the present invention is to provide a method of assembling an image reading apparatus having the step of mounting a reading unit on a frame member, the step of inserting the fore end of a transparent plate for supporting an original thereon into the transparent plate holding portion of the frame member, and the step of dropping the rear end of the transparent plate onto the frame member.

Further objects of the present invention will become apparent from the following detailed description taken in conjunction with the accompanying drawings.

DESCRIPTION OF THE PREFERRED EMBODIMENTS

Embodiment 1

Figure 1A:
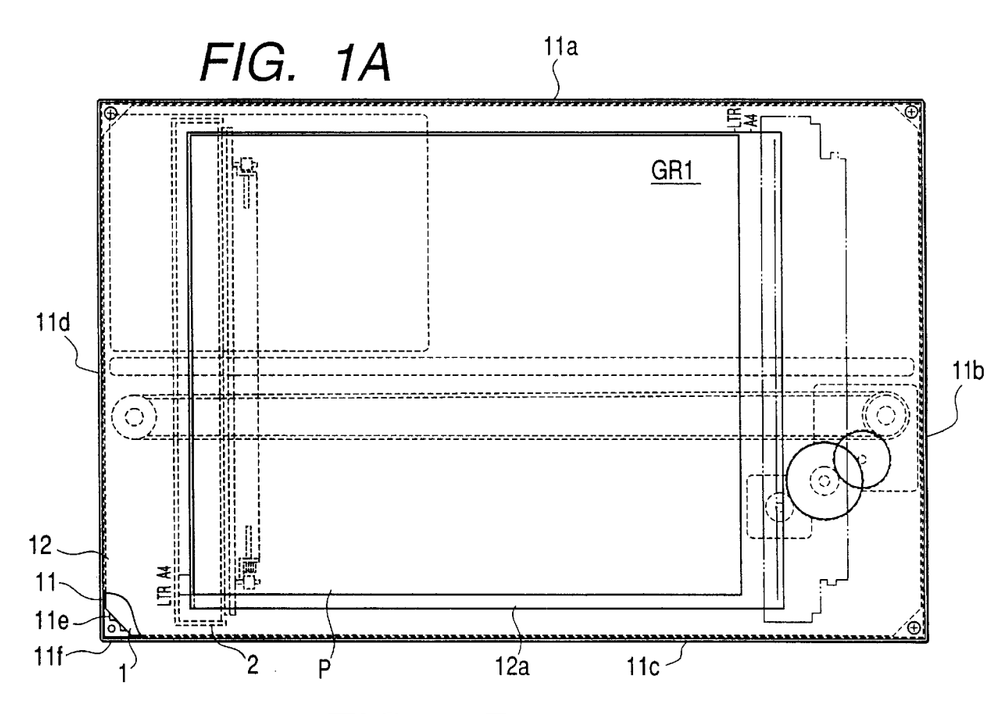
FIGS. 1A, 1B, 1C and 1D show a construction of an image reading apparatus according to a first embodiment of the present invention.
Figure 1B:
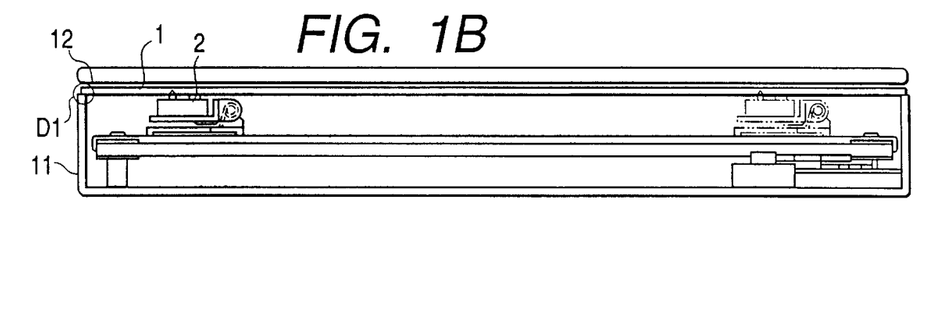
Figure 1C:
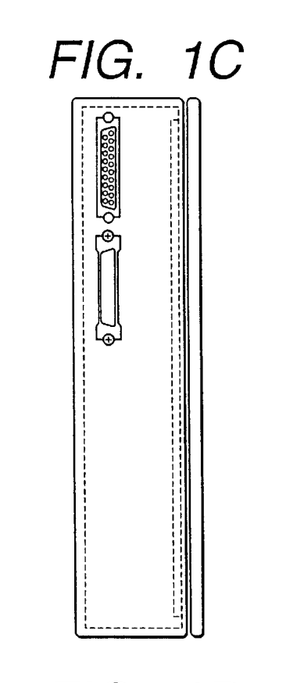
Figure 1D:
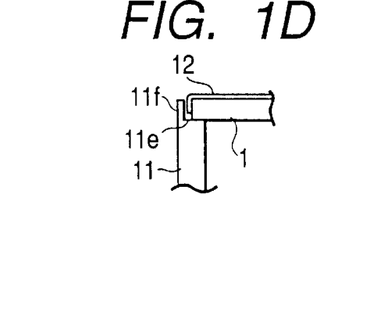

The present invention will hereinafter be described with reference to the drawings. FIGS. 1A, 1B, 1C and 1D illustrate a construction of an image reading apparatus GR1 such as an image scanner according to the present invention. FIG. 1A being a top plan view, FIG. 1B being a cross-sectional view of the image reading apparatus GR1 taken along the lengthwise direction thereof, FIG. 1C being a side view of the image reading apparatus GR1 in the widthwise direction thereof, and the apparatus is constructed in a three-dimensional fashion by FIGS. 1A, 1B and 1C. FIG. 1D is an enlarged view of a portion surrounded by a circle D1 in FIG. 1B.

In these figures, the letter P designates an original placed on original supporting glass plate 1, and a reading unit 2 as image reading means is scanned in parallelism to the original supporting glass plate 1 to thereby read the image information of the original P.

The reading unit 2 has incorporated therein an original irradiating light source similar to that described in connection with FIG. 6, a lens for imaging the reflected light from the original on the light receiving element of an image sensor, and the image sensor.

The reference numeral 11 denotes a frame member made of resin which serves also as an outer cover, and therein, besides the original supporting glass plate 1 and the reading unit 2, various constituent parts (elements constituting the image reading means) such as a rail for guiding the running of the reading unit, a transmitting mechanism for transmitting a driving force to the reading unit, a motor which is a drive source, a control board and a power source are fixedly supported by a fixing and supporting portion (such as a boss protruding from the bottom of the frame member 11).

The frame member 11 is of a box-shape having an opening portion in the upper part thereof, and the side walls 11a, 11b, 11c and 11d thereof have on the upper portions thereof stepped portions 11e as glass supporting portions for supporting the original supporting glass plate 1 thereon and edge portions 11f opposed to the cross-sections of the glass plate.

After the above-described constituent parts are installed in the frame member 11, the original supporting glass plate 1 is placed on the stepped portions 11e inside the edge portions 11f of the frame member 11. Further, a metallic plate 12 as a fixing member for mounting the original supporting glass plate 1 on the frame member 11 is placed and the four corners of this plate 12 and the four corners of the frame member 11 are secured by screws (engaging means).

Thereby, the four corners and four sides of the frame member 11 are brought into close contact with the original supporting glass plate 1, whereby a housing of high rigidity is obtained. The plate 12 has a square window portion 12a at the center thereof, and the original supporting glass plate 1 is exposed therethrough. Of the sides which are in contact with the window portion 12a, the inner and right sides provide the placement reference for the original P.

The plate 12 may be fixed in advance to the original supporting glass plate 1 by an adhesive double coated tape or the like. Thereby, an improvement in the assembling work can be achieved.

Also, in the foregoing description has been made of a construction in which the side walls 11a, 11b, 11c and 11d have the stepped portions 11e for supporting the original supporting glass plate 1 thereon, whereas this is not restrictive, but there are conceivable various forms in which supporting portions for supporting the original supporting glass plate 1 such as ribs adjacent to the side walls or independent stanchions are molded integrally with the frame member 11.

The effects of the present invention are as described below.

Firstly, a great reduction in cost can be achieved. In the image scanner according to the earlier technology, the outer cover (frame member) has often been formed by an upper cover for embracing the original supporting glass plate, and a lower cover for supporting the other constituent parts thereon.

The upper and lower covers are parts most costly in the image scanner, but according to the present invention, the frame member is an integrally molded one-piece member and therefore, the cost of parts is greatly reduced.

Secondly, the dimensional accuracy and rigidity required of the covers are greatly alleviated. In the construction according to the earlier technology, in order that the apparatus may display a normal function, it has been required that the lower cover which is a base for supporting the constituent parts thereon be formed with necessary flatness, and the rigidity enough for the flatness to be maintained has been required in order to maintain the function of the apparatus even if the apparatus is placed, for example, on a distorted desk.

On the other hand, the shape of the frame member is along the original supporting glass plate 1 having both of flatness and rigidity and therefore, even if the flatness and rigidity of the frame member 11 are more or less deficient both of the flatness and rigidity become sufficient in a state in which the original supporting glass plate 1 is fixed to the frame member.

Also, the reduction in the cost of the frame member 11 by these requirements being alleviated is as great as it cannot be missed.

Embodiment 2

An image reading apparatus GR2 of a construction in which the above-described embodiment is improved in the assembling work and rigidity of the apparatus is shown in FIGS. 2A, 2B, 2C, 2D and 2E.

Figures 2A, 2C:
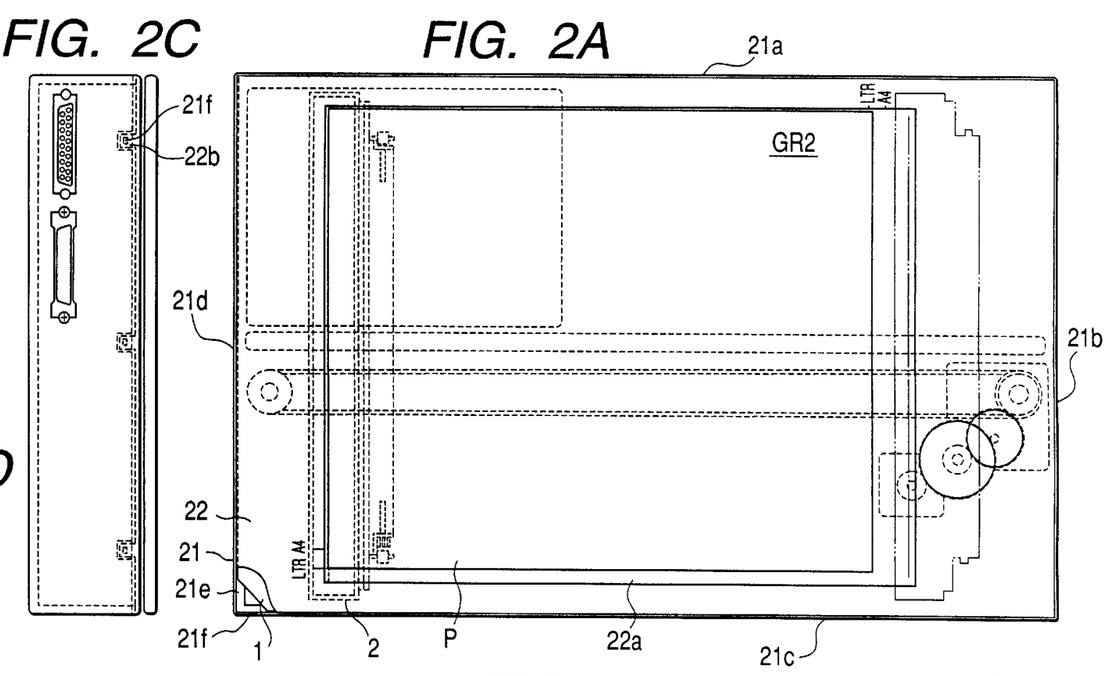
FIGS. 2A, 2B, 2C, 2D and 2E show a construction of an image reading apparatus according to a second embodiment of the present invention.
Figure 2B:
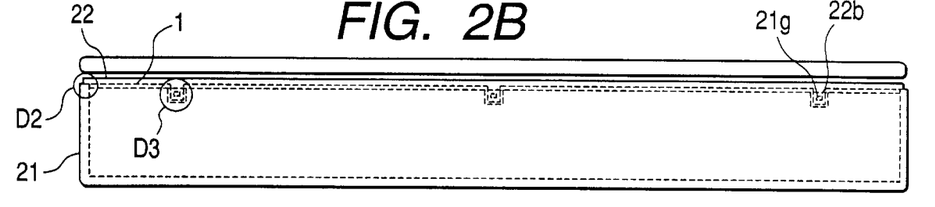
Figure 2D:
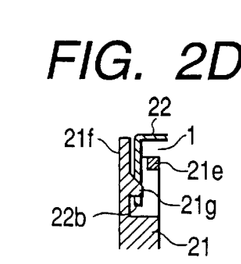
Figure 2E:
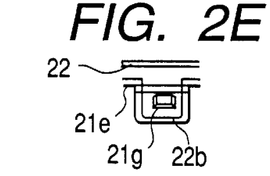

FIG. 2A is a top plan view of the image reading apparatus GR2, FIG. 2B is a cross-sectional view of the image reading apparatus GR2 taken along the lengthwise direction thereof, and FIG. 2C is a side view of the image reading apparatus GR2 in the widthwise direction thereof, and the apparatus is constructed in a three-dimensional fashion by FIGS. 2A, 2B and 2C. FIGS. 2D and 2E are enlarged views of portions surrounded by circles D2 and D3 in FIG. 2B.

In FIG. 2A, the reference numeral 22 designates a glass holding-down plate corresponding to the glass holding-down plate 12 in Embodiment 1, and it has at the center thereof a square window portion 22a through which the original supporting glass plate 1 is exposed as in the plate 12.

Also, the bent portions of the four sides of this glass holding-down plate 22 have hook portions 22b as engaging means at several locations. A frame member 21 has pawl portions 21g for hooks as engaging portions at locations opposed to the hook portions 22b of the glass holding-down plate 22.

The original supporting glass plate 1 is placed on the stepped portions 21e of the frame member 21 and from above it, the glass holding-down plate 22 is fitted so that the hook portions 22b may be engaged with the pawl portions 21g of the frame member 21, whereby the cover of the apparatus is formed.

As compared with the aforedescribed first embodiment, in this embodiment, the step of screwing the glass holding-down plate can be curtailed and the assembling work is improved.

Further, the side walls of the frame member 21 are liable to flex in a direction orthogonal thereto when they have a height or the thickness thereof is small, but the bent portions of the four sides of the glass holding-down plate 22 are engaged with the side walls, whereby the occurrence of the flexure is suppressed.

Again in the present embodiment, the improvement in the working property by sticking the frame member 21 on the original supporting glass plate 1 is possible.

In FIG. 2A, the reference characters 21a, 21b, 21c, 21d, 21e and 21f for the constituent portions of the frame member 21 correspond to the constituent portions 11a, 11b, 11c, 11d, 11e and 11f, respectively, of the frame member 11 in the first embodiment.

Embodiment 3

Figure 3A:
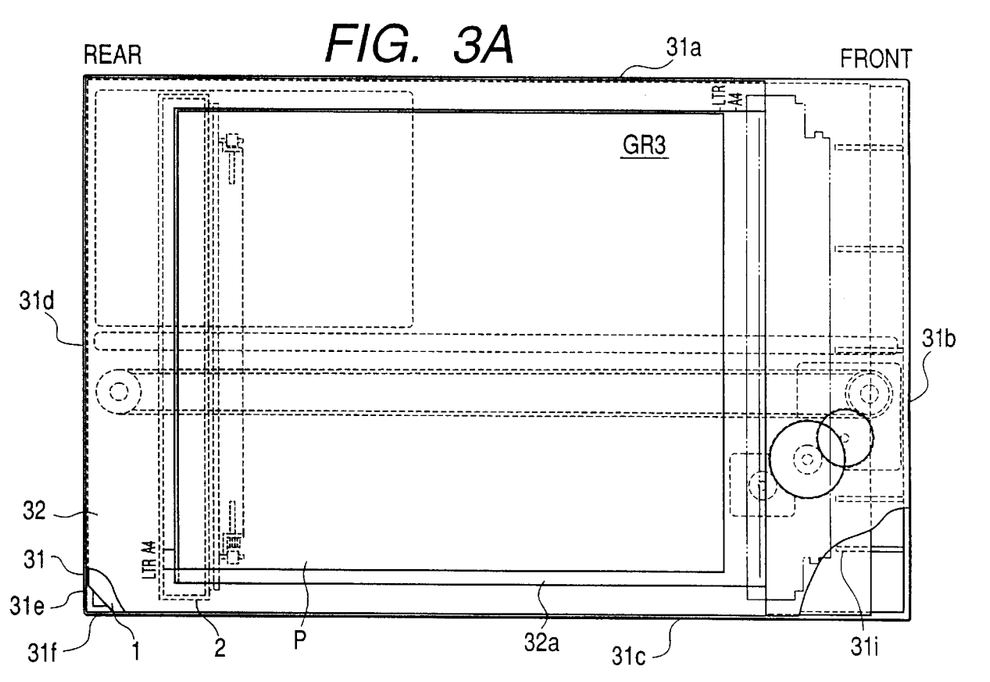
FIGS. 3A, 3B and 3C show a construction of an image reading apparatus according to a third embodiment of the present invention.
Figure 3B:
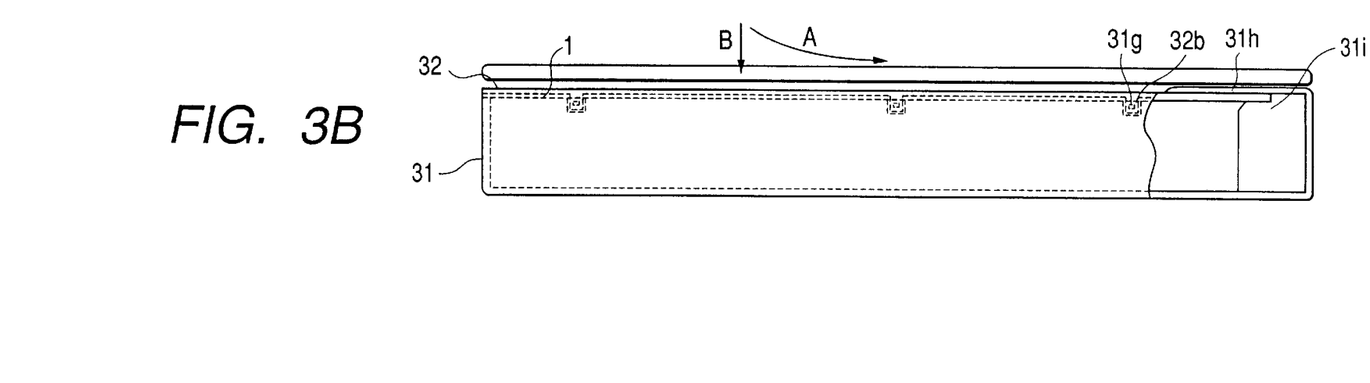
Figure 3C:
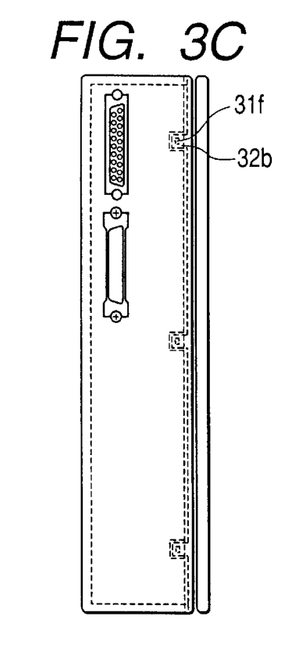

While the embodiments hitherto described are ones in which only the lower surface of the original supporting glass plate is supported by the frame member, in the present embodiment, one of the four sides of a frame member 31 is endowed with the function of supporting both of the upper and lower surfaces of the original supporting glass plate 1.

FIGS. 3A, 3B and 3C show an image reading apparatus GR3 to which the present invention is applied. The relation among FIGS. 3A, 3B and 3C is similar to that among FIGS. 1A, 1B and 1C and that among FIGS. 2A, 2B and 2C. The side wall 31b on the front face (the right side as viewed in FIG. 3A) of the frame member 31 has a top surface portion 31h and a rib 31i. As regards this shape, the frame member 31 can be molded as a unit by using the structure of a metal mold generally called an inner slide. The spacing between the lower surface of the top surface portion 31h and the upper surface of the rib 31i is substantially equal to the thickness of the original supporting glass plate 1.

The other three side walls 31a, 31c and 31d are of a shape similar to that in Embodiment 2. The upper surface of the rib 31i on the front face is in the same plane (the same height) as the glass supporting surface 31e of the side wall. As shown, the front face of the original supporting glass plate 1 is inserted between the top surface portion and rib of the front of the frame member (arrow A), and is lowered onto the supporting surface (arrow B). The arrows A and B show the procedure of mounting the original supporting glass plate 1.

A glass holding-down plate 32 applied to the present embodiment is a U-shaped metal plate having a hook similar to that in Embodiment 2. After the original supporting glass plate 1 is placed on the frame member 31, the hook of the glass holding-down plate 32 is fitted to the pawl portion of the frame member 31, whereby an apparatus cover is formed.

While in the foregoing description, the top surface portion 31h constructed integrally with the frame member is provided on the front face of the apparatus, it may be provided on the rear surface or the side of the apparatus depending on the apparatus construction.

Again in the present embodiment, the four corners and four sides of the frame member 31 are in close contact with the original supporting glass plate 1 and a housing of high rigidity is obtained.

A further reduction in the cost of parts and an improvement in the assembling work can be achieved by the present embodiment.

In FIG. 3A, the reference characters 31a, 31b, 31c, 31d, 31e and 31f for the constituent portions of the frame member 31 correspond to the constituent portions 21a, 21b, 21c, 21d, 21e and 21f, respectively, of the frame member 21 in the second embodiment.

Embodiment 4

Figure 4A:
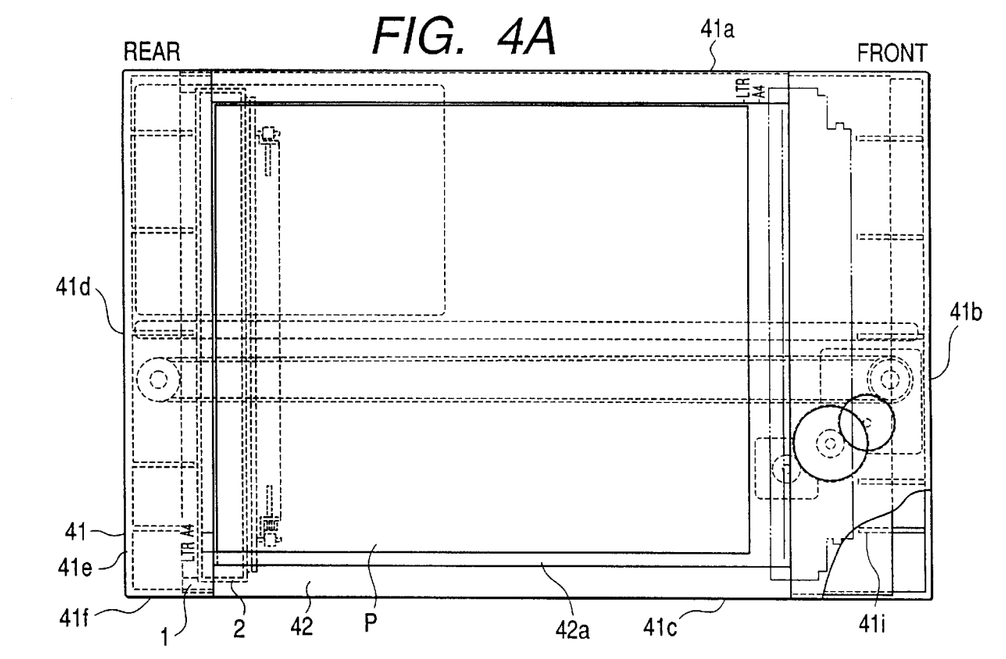
FIGS. 4A, 4B and 4C show a construction of an image reading apparatus according to a fourth embodiment of the present invention.
Figure 4B:
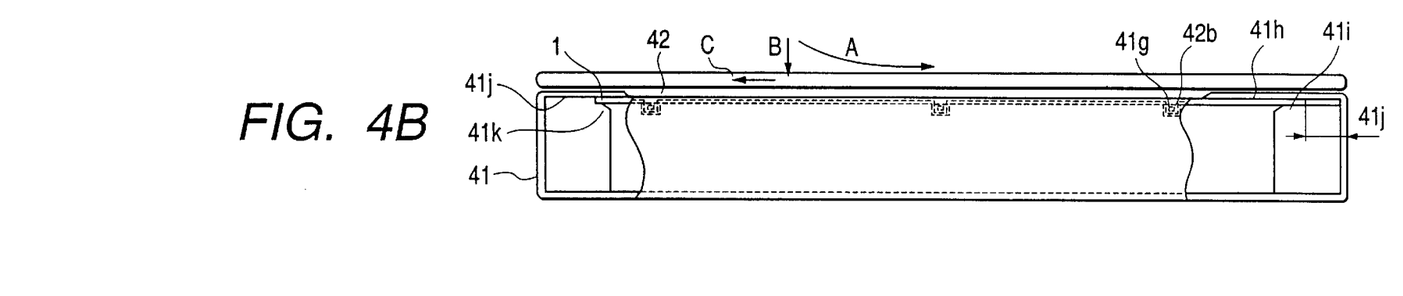
Figure 4C:
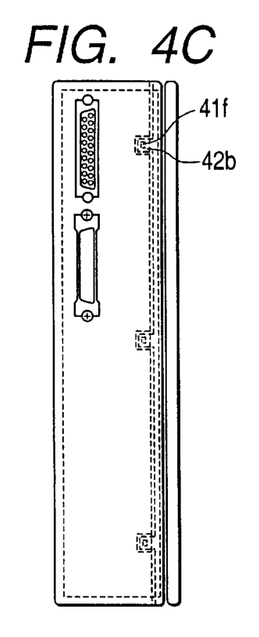

The integral molding of the ceiling and rib using the inner slide as described in the above-described embodiments can be provided on a set of side walls opposed to each other (in this embodiment, a side wall 41b and a side wall 41d) in terms of the structure of the metal mold.

When such structure is adopted, the spacing between the above-mentioned set of side walls is made longer than the full length of the original supporting glass plate 1 and further, the front side wall 41b is provided with a slide allowance 41j for the mounting of the original supporting glass plate 1.

As shown in FIGS. 4A, 4B and 4C, the front face of the original supporting glass plate 1 is inserted between the top surface portion 41h and rib 41i on the front portion of a frame member (arrow A), and is lowered onto the supporting surface (arrow B), and the rear surface of the original supporting glass plate 1 is inserted between the top surface portion 41j and rib 41k on the rear portion of the frame member (arrow C) whereby the original supporting glass plate 1 is incorporated into the frame member 41.

The arrows A, B and C show the procedure of mounting the original supporting glass plate 1.

A glass holding-down plate 42 of L-shaped cross-section is mounted on side walls 41a and 41c free of the top surface portion, whereby the original supporting glass plate 1 is fixed and an apparatus cover is formed.

As in Embodiment 3, the four corners and four sides of the frame member 41 are in close contact with the original supporting glass plate 1, and a housing of high rigidity is obtained.

In FIG. 4A, the reference characters 41a, 41b, 41c, 41d, 41e, 41f and 41g for the constituent portions of the frame member 41 correspond to the constituent portions 31a, 31b, 31c, 31d, 31e, 31f and 31g, respectively, of the frame member 31 in the third embodiment.

Embodiment 5

A fifth embodiment of the present invention will now be described. FIGS. 8A, 8B, 8C, 9A, 9B and 9C show an example of the construction of an image reading apparatus according to the present invention. In the figures, the letter P designates an original to be read which is placed on an original supporting glass plate 1, and a reading unit 2 is scanned in parallelism to the original supporting glass plate 1 to thereby read an image on the original. The reading unit 2 has incorporated therein a light source for irradiating the original, a lens for imaging the reflected light from the original on the light receiving element of an image sensor, and the image sensor. The reference numeral 51 denotes a frame member serving also as an outer cover and there are contained therein, besides the original supporting glass plate 1 and the reading unit 2, a rail for guiding the running of the reading unit, a transmitting mechanism for transmitting a driving force to the reading unit, a motor which is a drive source, a control board, a power source, etc.

Figure 8A:
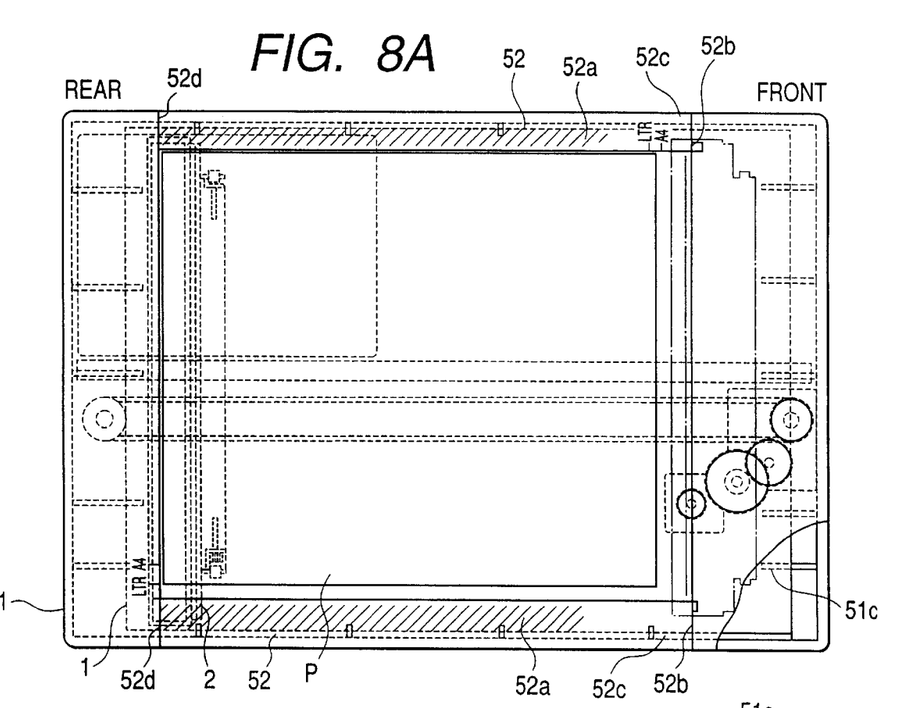
FIGS. 8A, 8B and 8C show a construction of an image reading apparatus according to a fifth embodiment of the present invention.
Figure 8B:
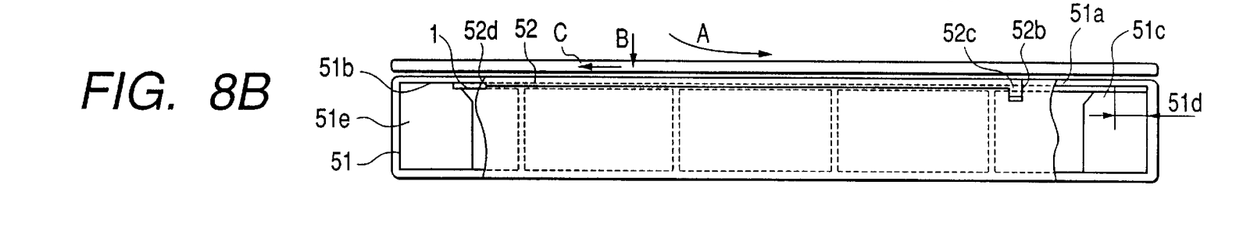
Figure 8C:
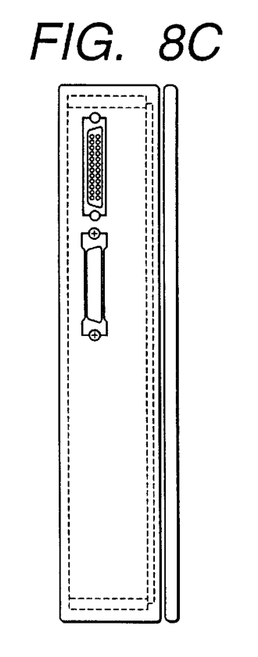

The frame member 51 is of a hollow box-shape having front, rear, left and right peripheral walls and a bottom plate, and ceilings 51a and 51b are provided along the front and rear sides of the frame member 51, and the frame member 51 is made by the molding of resin. In the present embodiment, the direction of movement when mounting the original supporting glass plate on the frame member is defined as the longitudinal direction, and in FIG. 8A, the right side is defined as the front, the left side is defined as the rear, the upper side is defined as the left, and the lower side is defined as the right. However, the original supporting glass plate 1 can also be mounted by being moved in a vertical direction (i.e., the left to right direction) as viewed in FIG. 8A. The spacing between the front and rear side walls of the cover 51 is made longer than the full length of the original supporting glass plate 1 and further, on the front side wall portion, a slide allowance 51d for the mounting of the glass plate is provided between the ceiling 51a and the rib 51c.

Figure 9A:
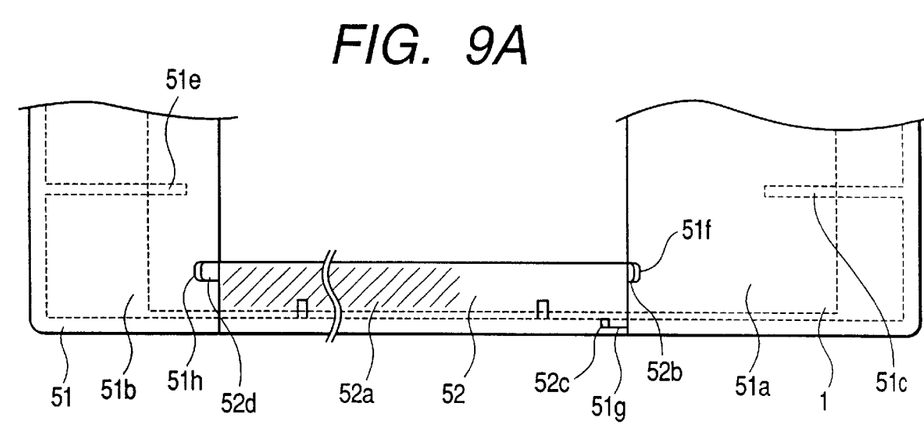
FIGS. 9A, 9B and 9C are views for illustrating a relation between a frame member and a glass holding-down plate in the fifth embodiment.
Figure 9B:
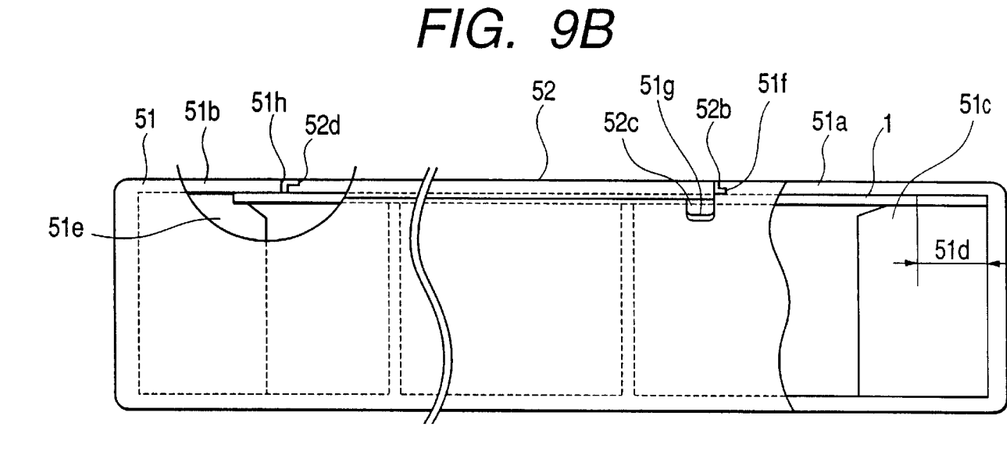
Figure 9C:
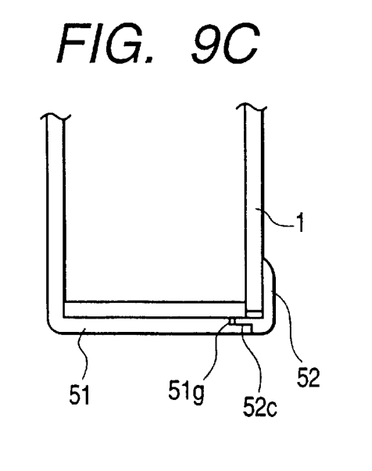

The reference numeral 52 denotes a glass holding-down plate, i.e., a glass mounting member, made of resin and having a function as the reference during the setting of the original, and secured to the both ends of the longer sides, i.e., the left and right ends, of the original supporting glass plate 1, in parallelism thereto and with a predetermined spacing by securing means such as an adhesive double coated tape or an adhesive agent. The reference character 52a (hatched portion) represents a stuck portion or a secured portion, and a part of the front end portion of the plate 52 which is a mounting member is not secured. Also, a convex portion or pawl portion 52b for positioning in the left to right direction relative to the cover and a convex portion or pawl portion 52c for positioning in the longitudinal direction are provided on the front end portion of the plate 52, and a convex portion or pawl portion 52d for positioning in the left to right direction is provided on the rear end of the plate 52. The cover 51 is provided with grooves 51f, 51g and 51h which are fitting recesses corresponding to these convex portions.

Figure 10A:
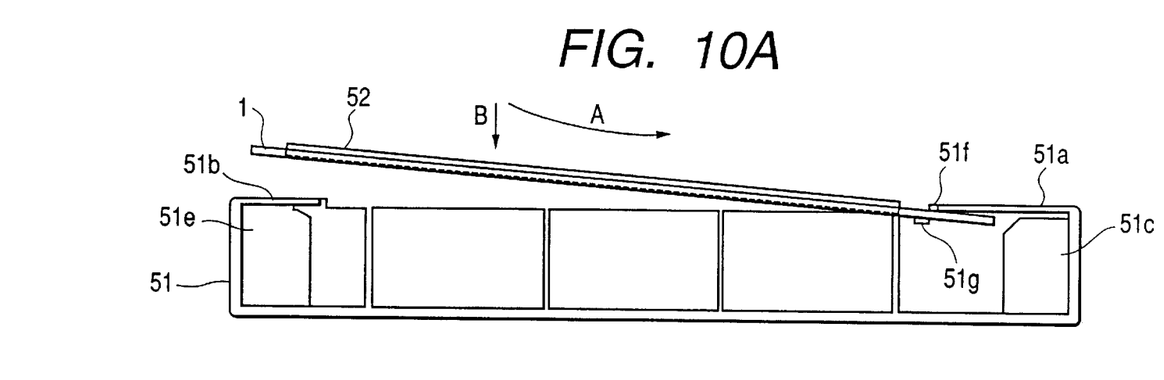
FIGS. 10A, 10B and 10C are illustrations showing the procedure of mounting the original supporting glass plate of the image reading apparatus according to the fifth embodiment.
Figure 10B:
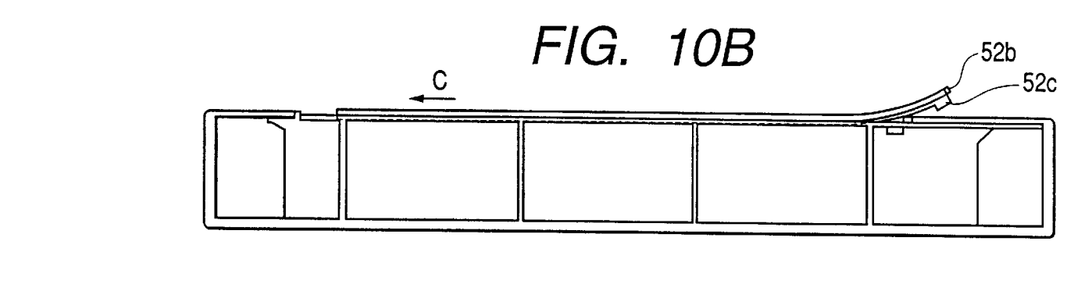
Figure 10C:
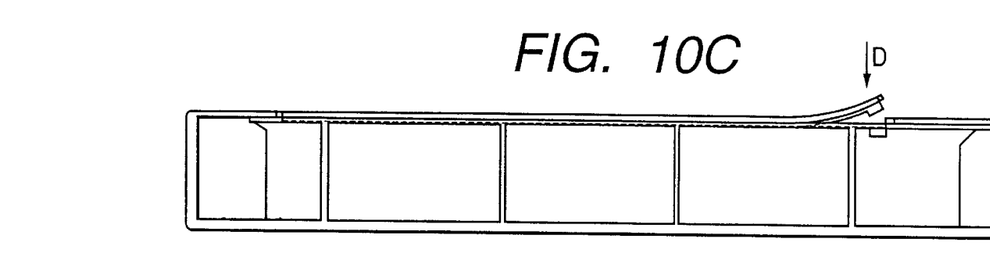

Description will now be made of a method of mounting the original supporting glass plate comprising the present construction with reference to FIGS. 10A, 10B and 10C.

Arrows A, B, C and D show the procedure of mounting the original supporting glass plate 1. First, the front end of the original supporting glass plate 1 is inserted into this side of the cover 51. At this time, the front side portions of the glass holding-down plates on the both ends are raised as shown in FIG. 10B. As described above, these portions are not adhered to the glass plate and therefore, when raised, they flex and can be floated from the glass plate. When the glass plate is shifted to this side along the slide allowance 51c of the cover 51, the rear end of the glass plate soon drops onto the glass supporting portion of the cover. When thereafter, the glass plate is shifted rearwardly, the glass plate has its front surface and back surface held by the ceiling 51b and rib 51e of the cover, and the positioning pawl portion 52d at the rear end of the holding-down plate fits in the corresponding groove of the cover. When subsequently, the front end of the holding-down plate is pushed in downwardly, the pawl portion 52b for positioning in the left to right direction and the pawl portion 52c for positioning in the longitudinal direction fit in the corresponding grooves of the cover, whereby the original supporting glass plate is fixed to the cover.

According to the present embodiment, the holding-down plate is stuck on the original supporting glass plate and therefore, it never happen that as in the earlier technology, the original is held therebetween, and the original supporting glass plate is reliably fixed. Further, the part for mounting the original supporting glass plate is a single mounting member and therefore, a reduction in the cost of parts is brought about and an improvement in the assembling work is also brought about.

Embodiment 6

For the necessity of ensuring the safety of products to users, it is required that the apparatus cannot be disassembled without some tool. So, in the present embodiment, reference is had to FIGS. 11A, 11B and 11C to describe the provision of disassembly preventing means.

Figure 11A:
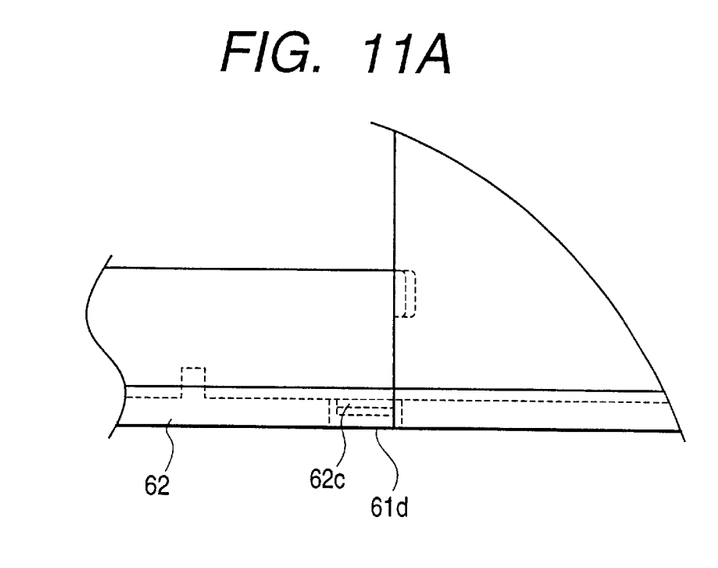
FIGS. 11A, 11B and 11C are views for illustrating a relation between a frame member and a glass holding-down plate in an apparatus according to a sixth embodiment of the present invention.
Figure 11B:
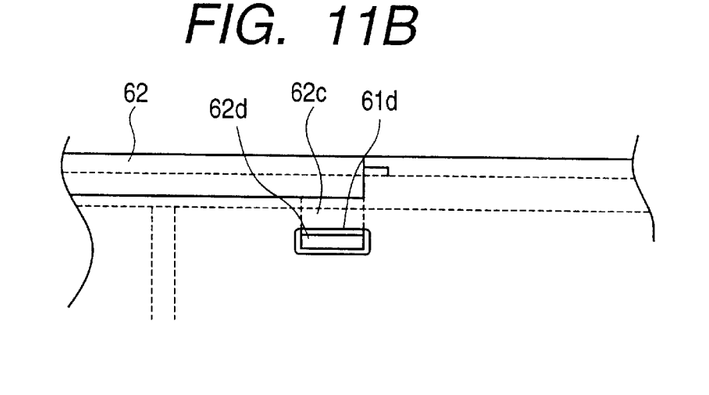
Figure 11C:
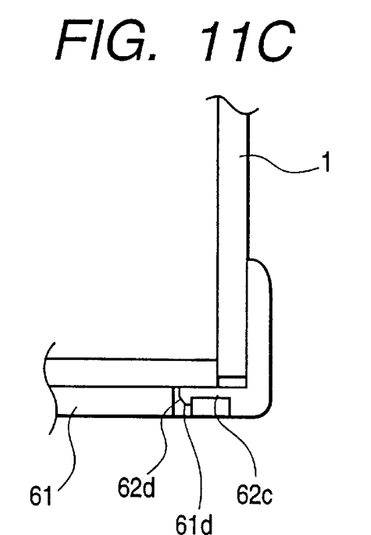

The basic construction of the present embodiment is the same as that of the fifth embodiment. A projected portion 62d is provided on the tip end of the pawl portion 62c of a glass holding-down plate 62 for positioning in the longitudinal direction, and an aperture 61d for engagement is provided at a location on a cover 61 which is opposed to the projection 62d.

The aperture is sufficiently small so as to permit the entry of a thin driver or the like thereinto.

When by a procedure similar to that in the aforedescribed embodiment, the glass plate is incorporated into the cover and the front end portion of the holding-down plate is pushed in downwardly, the positioning in the longitudinal direction and the left to right direction is done and the projection 62d of the holding-down plate is engaged with the aperture 61d of the cover. Since the aperture is sufficiently small and is at a sufficiently inner location, the cover cannot be opened without a tool such as a timepiece driver and safety is secured.

The projection and aperture for realizing the same function are not restricted to these locations, but can be provided at any positions such as the fore ends of other positioning portions.

The present invention is not restricted to the above-described embodiments, but also covers modifications of the same technical idea.

What is claimed is:

1. An image reading apparatus including:

a transparent plate for supporting an original thereon;

a reading unit for reading an original supported on said plate, said reading unit including a light source for illuminating the original, an image sensor, and an imaging member for imaging light reflected from the original; and a moving mechanism for moving said reading unit to scan the original; and a one-piece frame member for containing said reading unit and said moving mechanism therein, said transparent plate being held by said frame member, wherein said frame member has a pinching portion for holding at least one side of said transparent plate from a vertical direction.

2. An image reading apparatus according to claim 1, wherein said frame member is a unitary molded member.

3. An image reading apparatus according to claim 1, wherein said pinching portion is provided at each of a front and a rear positions as viewed in the direction in which said transparent plate is mounted on said frame member.

4. An image reading apparatus according to claim 1, wherein a portion of the one-piece frame member is formed to support both upper and lower surfaces of the transparent plate.

5. An image reading apparatus according to claim 1, wherein an aperture is sized to permit disassembly with a screwdriver.

6. An image reading apparatus according to claim 1, wherein the one-piece frame member has sidewalls with stepped portions to support the transparent plate thereon.

7. An image reading apparatus according to claim 6, wherein the hold-down plate has engagement portions formed thereon to engage the stepped portions of the one-piece frame member.

8. An image reading apparatus according to claim 1, further including a hold-down plate for fixing said transparent plate to said frame member.

9. An image reading apparatus according to claim 8, wherein said transparent plate is sandwiched between said hold-down plate and said frame member, and said hold-down plate has its four corners fixed to said frame member by screws.

10. An image reading apparatus according to claim 8, wherein said transparent plate is sandwiched between said hold-down plate and said frame member, and said hold-down plate is fixed to said frame member by hooks provided on the four sides of said hold-down plate and pawl portions at the corresponding locations on said frame member.

11. An image reading apparatus according to claim 8, wherein said hold-down plate is adhesively secured to said transparent plate.

12. An image reading apparatus according to claim 11, wherein the adhesively secured area of said hold-down plate to said transparent plate is an area except a fore end as viewed in the direction in which said transparent plate is mounted on said frame member.

13. An image reading apparatus according to claim 11, wherein said hold-down plate has a positioning portion for positioning said transparent plate relative to said frame member.

14. An image reading apparatus according to claim 8, wherein the hold-down plate has a square window portion at its center that exposes a portion of the transparent plate, thereby providing a reference point for the original.

15. A method of assembling an image reading apparatus, including the steps of:

mounting a reading unit and a moving mechanism on a frame member, wherein said reading unit is adapted to read an original and includes a light source for illuminating the original, an image sensor, and an imaging member for imaging light reflected from the original, and wherein said moving mechanism is adapted to move said reading unit to scan the original;

inserting a fore end of a transparent plate for supporting the original thereon into a transparent plate sandwiching portion of said frame member;

dropping a rear end of said transparent plate onto said frame member; and sliding said transparent plate rearwardly after the rear end of said transparent plate has been dropped onto said frame member.

16. A method of assembling an image reading apparatus, including the steps of:

mounting a reading unit and a moving mechanism on a frame member, wherein said reading unit is adapted to read an original and includes a light source for illuminating the original, an image sensor, and an imaging member for imaging light reflected from the original, and wherein said moving mechanism is adapted to move said reading unit to scan the original;

inserting a fore end of a transparent plate for supporting the original thereon into a transparent plate sandwiching portion of said frame member;

dropping a rear end of said transparent plate onto said frame member; and fixing said transparent plate to said frame member by a hold-down plate.

17. An image reading apparatus comprising:

a one-piece frame member having four peripheral walls of which a pair of opposed walls are provided with ceiling members, respectively;

a transparent plate for supporting an original thereon, wherein a front end and a rear end of said transparent plate are disposed in contact with said ceiling members;

a hold-down plate which is secured to a right end and a left end and to said rear end of said transparent plate by an adhesive, but is left unsecured to said front end of said transparent plate; and a reading unit for reading an original, said reading unit being disposed in a housing formed by said frame member and said transparent plate, wherein a mounting of said hold-down plate to said frame member is performed while separating said front end of said hold-down plate from said transparent plate, and wherein said hold-down plate is fixed to said frame member so that said transparent plate is fixed to said frame member.

* * * * *

UNITED STATES PATENT AND TRADEMARK OFFICE
CERTIFICATE OF CORRECTION

PATENT NO.    : 6,661,538 B1
DATED         : December 9, 2003
INVENTOR(S)   : Yukitoshi Takeuchi It is certified that error appears in the above-identified patent and that said Letters Patent is hereby corrected as shown below:

<u>Title page,</u>
Item [56], References Cited, U.S. PATENT DOCUMENTS, "Boapati" should read -- Bodapati --.
Item [57], ABSTRACT,
Line 4, "held the" should read—held by the --.

<u>Column 1,</u>
Line 66, "dradation"should read -- gradation --.

<u>Column 2,</u>
Line 36, "has" should read -- have --; and
Line 48, "had" should read -- has --.

<u>Column 4,</u>
Line 41, "in the" should read -- the --.

<u>Column 5,</u>
Line 51, "they have a" should read -- the --.

<u>Column 8,</u>
Line 53, "some tool" should read -- tools --; and
Line 54, "is had" should read -- is made --.

UNITED STATES PATENT AND TRADEMARK OFFICE
CERTIFICATE OF CORRECTION

PATENT NO.     : 6,661,538 B1
DATED          : December 9, 2003
INVENTOR(S)    : Yukitoshi Takeuchi It is certified that error appears in the above-identified patent and that said Letters Patent is hereby corrected as shown below:

Column 9,
Line 57, "comers" should read -- corners --.

Signed and Sealed this

Twenty-seventh Day of July, 2004

JON W. DUDAS
*Acting Director of the United States Patent and Trademark Office*